(12) United States Patent
McNicoll

(10) Patent No.: US 10,218,383 B2
(45) Date of Patent: Feb. 26, 2019

(54) KEYPAD

(71) Applicant: NCR Corporation, Duluth, GA (US)

(72) Inventor: Grant A. McNicoll, Angus (GB)

(73) Assignee: NCR Corporation, Atlanta, GA (US)

( * ) Notice: Subject to any disclaimer, the term of this patent is extended or adjusted under 35 U.S.C. 154(b) by 247 days.

(21) Appl. No.: 13/926,454

(22) Filed: Jun. 25, 2013

(65) Prior Publication Data

US 2014/0375481 A1 Dec. 25, 2014

(51) Int. Cl.
| | |
|---|---|
| *H03M 11/00* | (2006.01) |
| *G06F 21/83* | (2013.01) |
| *G07F 7/10* | (2006.01) |
| *G06F 21/86* | (2013.01) |
| *G06F 3/02* | (2006.01) |
| *G06F 3/041* | (2006.01) |

(52) U.S. Cl.
CPC ......... *H03M 11/006* (2013.01); *G06F 3/0219* (2013.01); *G06F 3/0416* (2013.01); *G06F 21/83* (2013.01); *G06F 21/86* (2013.01); *G07F 7/1016* (2013.01); *G06F 2221/2143* (2013.01)

(58) Field of Classification Search
CPC .. H03K 17/9622; H03K 17/98; H03K 17/975; H03K 17/962; H03K 17/955; H03K 17/96; H03K 17/972; H03K 17/967; H03K 2217/960705; H03K 2217/96079; H03K 2217/960755; H03K 2217/96077; H03K 2217/9655; H03K 2217/9653; H03K 2017/9613; H03K 2017/9615; H03K 2017/9755; H03K 5/249; G06F 3/0202; G06F 3/044
USPC .................................................... 341/22–34
See application file for complete search history.

(56) References Cited

U.S. PATENT DOCUMENTS

| | | | | |
|---|---|---|---|---|
| 3,653,038 | A * | 3/1972 | Webb | H01H 13/702 235/145 R |
| 4,644,326 | A | 2/1987 | Villalobos et al. | |
| 5,654,701 | A * | 8/1997 | Liao | H05K 5/0208 341/22 |
| 6,542,355 | B1 * | 4/2003 | Huang | G06F 3/0202 312/223.2 |
| 6,853,093 | B2 * | 2/2005 | Cohen | H01L 23/576 257/678 |
| 7,270,275 | B1 * | 9/2007 | Moreland | H01H 13/702 200/61.93 |

(Continued)

FOREIGN PATENT DOCUMENTS

WO  2009103594 A1  8/2009

OTHER PUBLICATIONS

European Patent Office Action dated Nov. 8, 2016 in co-pending European Patent Application No. 14163917.9.

*Primary Examiner* — Laura Nguyen
(74) *Attorney, Agent, or Firm* — Schwegman, Lundberg & Woessner

(57) ABSTRACT

A keypad is described. The keypad comprises: a keypad housing defining a plurality of key apertures; a plurality of physical keys, each physical key located in a respective key aperture and being moveable with respect to the key aperture; and a non-contact (for example, capacitive) sensing layer located beneath the plurality of keys. A touch controller is coupled to the capacitive sensing layer and is operable to ascertain a touch location corresponding to a depressed key. A cryptographic controller may be provided in communication with the touch controller and is operable to interpret the touch location.

4 Claims, 3 Drawing Sheets

(56) References Cited

U.S. PATENT DOCUMENTS

| | | | |
|---|---|---|---|
| 7,305,565 B1* | 12/2007 | Lungaro | G06Q 20/00 713/189 |
| 7,832,628 B2 | 11/2010 | Mittler | |
| 8,392,846 B2 | 3/2013 | Carapelli | |
| 8,522,049 B1* | 8/2013 | Ahmadi | G06F 21/86 713/193 |
| 8,621,235 B2 | 12/2013 | Barrowman et al. | |
| 2002/0016914 A1* | 2/2002 | Seki | G06F 21/6209 713/172 |
| 2002/0066020 A1* | 5/2002 | Whytock | G07F 7/10 713/191 |
| 2002/0093489 A1* | 7/2002 | Kaikuranta | H03K 17/98 345/169 |
| 2006/0258325 A1* | 11/2006 | Tsutaichi | H04M 1/18 455/350 |
| 2007/0152042 A1* | 7/2007 | Mittler | G06F 3/0202 235/383 |
| 2007/0204173 A1* | 8/2007 | Kuhn | G06F 21/83 713/194 |
| 2009/0058628 A1* | 3/2009 | Kirmayer | G06Q 20/341 340/501 |
| 2011/0050620 A1* | 3/2011 | Hristov | G06F 3/0416 345/174 |
| 2012/0180140 A1 | 7/2012 | Barrowman et al. | |
| 2012/0193207 A1* | 8/2012 | He | G06F 21/83 200/5 A |
| 2012/0228111 A1* | 9/2012 | Peterson | H03K 17/962 200/600 |
| 2012/0305648 A1* | 12/2012 | Sondhi | H05K 1/0275 235/441 |
| 2013/0140364 A1* | 6/2013 | McJones | G06K 7/082 235/449 |
| 2013/0148804 A1* | 6/2013 | Lin | G07F 19/201 380/52 |
| 2013/0300453 A1* | 11/2013 | Carapelli | H03K 19/003 326/8 |
| 2014/0062684 A1* | 3/2014 | Casparian | G06F 3/016 340/407.2 |
| 2014/0146485 A1* | 5/2014 | Wilhelm | G08B 13/02 361/730 |
| 2014/0292660 A1* | 10/2014 | Dickenson | G06F 3/021 345/168 |
| 2014/0297540 A1* | 10/2014 | Swamy | G06K 7/0004 705/71 |

* cited by examiner

KEYPAD

FIELD OF THE INVENTION

The present invention relates to a keypad. In particular, but not exclusively, the present invention relates to an encrypting PIN (personal identification number) pad (EPP).

BACKGROUND OF THE INVENTION

It is known for a variety of unattended PIN entry devices (PEDs) to include an encrypting keypad to allow a customer to enter a PIN code in a secure manner. Such a keypad is known in the art as an Encrypting PIN pad (or EPP) and may include only a secure keypad as a customer interface and rely upon external displays and card readers of the PED.

Known PEDs include Self-Service Terminal (SSTs), such as Automated Teller Machines (ATMs), automated fuel dispensers, kiosks and vending machines, or the like. An ATM typically requires a customer to enter a secure PIN code via an EPP in the ATM for authorizing a customer transaction at the ATM. Operational cryptographic keys and master keys of the financial institution owning the ATM, for example, are also typically stored in secure memory and/or a cryptographic processor of an EPP.

People with malicious intent have been known to probe into an EPP in an attempt to capture customer PIN codes when they are entered, or even read operational cryptographic keys and master keys of the financial institution, thereby placing customers' money (and the financial institution's money) at risk. Accordingly, the physical and electronic design and manufacture of EPPs must adhere to increasingly strict requirements, regulations and certifications.

EPPs have a clearly defined physical boundary and a tamper-resistant or tamper-evident shell. An EPP conventionally includes a keyboard panel, a lining plate, keys, a water-resistant sealing layer, a main control board and a base plate. The EPP is assembled by stacking up these components in sequence and securing them together.

EPPs are also tamper responsive in that they will destroy critical information if the EPP is tampered with, thereby preventing the critical information, such as encryption keys, being disclosed to an attacker.

SUMMARY OF THE INVENTION

It is an aim of certain embodiments of the present invention to at least partly mitigate one or more of the above-mentioned problems or of other problems associated with prior art EPPs.

According to a first aspect there is provided a keypad comprising: a keypad housing defining a plurality of key apertures; a plurality of physical keys, each physical key located in a respective key aperture and being moveable with respect to the key aperture; a capacitive sensing layer located beneath the plurality of keys; and a touch controller coupled to the capacitive sensing layer and operable to ascertain a touch location corresponding to a depressed key.

The keypad may further comprise a cryptographic controller to provide an encrypting keypad. The cryptographic controller may be integrated with the touch controller, or separate thereto but in communication therewith.

The encrypting keypad may comprise an encrypting PIN Pad.

The capacitive sensing layer may comprise electrically conducting tracks disposed on a printed circuit board, such as FR-4. The electrically conducting tracks may comprise copper tracks. The copper tracks may be disposed in a grid layout.

The EPP may further comprise a switch layer mounted above the capacitive sensing layer. The switch layer may define a plurality of flexing dome switches such that the dome flexes when a corresponding key is depressed, thereby providing a user with a tactile response.

The switch layer may define a plurality of separation switches, such that posts may be mounted between an under surface of the keypad housing and the continuity switches so that if the EPP is disassembled, the posts would cease to depress the separation switches. This could be monitored (the change in switch state that results) so that any confidential information (such as cryptographic keys and algorithms) stored in the EPP could be deleted.

The EPP may further comprise an elastomeric layer mounted above the switch layer. The elastomeric layer may provide water-resistance for the EPP. The elastomeric layer may comprise rubber.

The EPP may further comprise a first mesh layer beneath the capacitive sensing layer for detecting penetration therethrough.

The EPP may further comprise a second mesh layer beneath the capacitive sensing layer for detecting penetration therethrough.

The touch controller and the cryptographic controller may both be mounted on an encryption circuit board.

The encryption circuit board may comprise a plurality of components that screen the touch controller and the cryptographic controller to protect against side attacks to the touch controller or the cryptographic controller.

The touch controller may be coupled to the capacitive sensing layer by a three dimensional connector (such as an elastomeric connector) that protrudes through a conducting spacer plate separating the encryption circuit board from the capacitive sensing layer.

A suitable secure touch sensor is available from Cirque Corporation, 2463 South 3850 West, Salt Lake City, Utah 84120-2335.

According to a second aspect there is provided a Self-Service Terminal (SST) comprising a keypad according to the first aspect.

According to a third aspect there is provided a method of detecting data entered at an EPP, the method comprising the steps of: detecting physical depression of a key in the EPP using a touch sensitive controller, and providing a touch location to a cryptographic controller for interpreting and encrypting as part of a transaction.

According to a fourth aspect there is provided a keypad comprising: a keypad housing defining a plurality of key apertures; a plurality of physical keys, each physical key located in a respective key aperture and being moveable with respect to the key aperture; a non-contact sensing layer located beneath the plurality of keys; and a touch controller coupled to the non-contact sensing layer and operable to ascertain a touch location corresponding to a depressed key.

The keypad may further comprise a cryptographic controller in communication with the touch controller for operating on data input via the physical keys.

According to a fifth aspect there is provided an encrypting keypad comprising: a keypad housing providing individually depressable keys to a user; and a sensing layer located beneath the individually depressable keys and operable to ascertain which of the individually depressable keys is depressed using proximity sensing.

The proximity sensing may be implemented by capacitive, resistive, inductive, or other similar technologies.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1A:
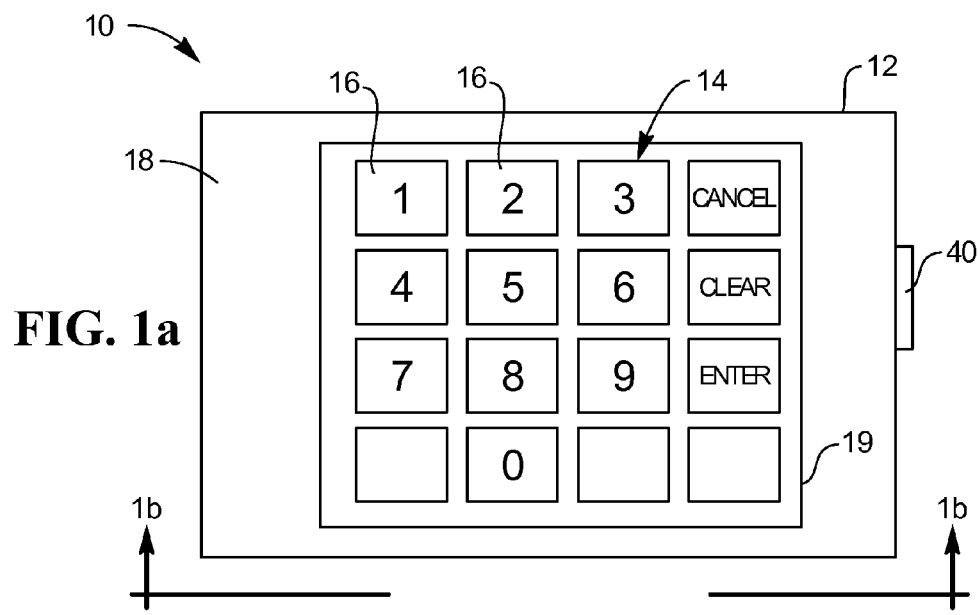
FIGS. 1a to 1c illustrate an encrypting PIN pad (EPP) according to a first embodiment of the present invention.

In the drawings like reference numerals refer to like parts.

Figure 1B:
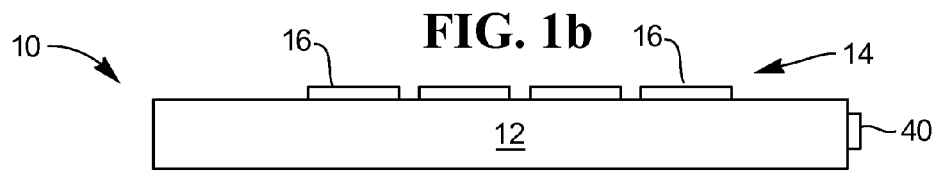
Figure 1C:
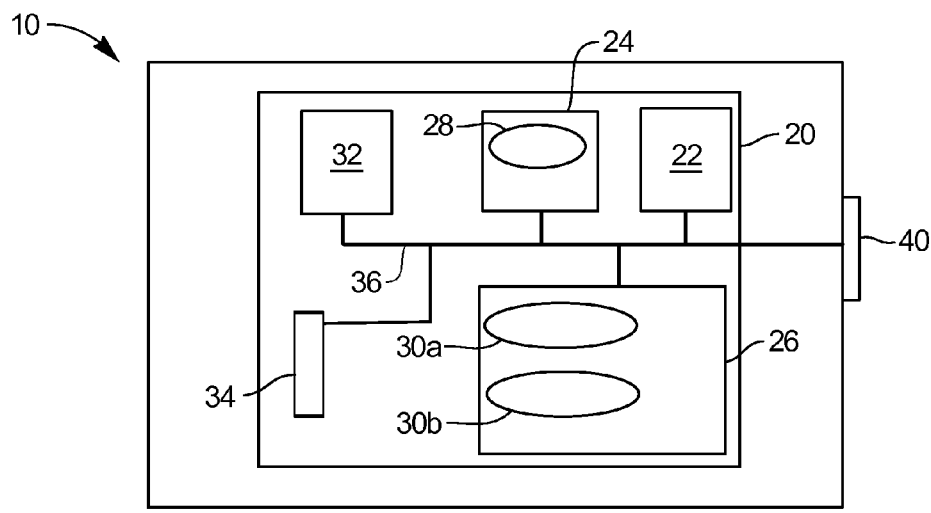

Reference is first made to FIGS. 1a to 1c, which illustrate an Encrypting PIN Pad (EPP) 10 according to one embodiment of the present invention.

The EPP 10 comprises a keyboard body (also referred to as a keypad housing) 12 which supports a keypad 14 including sixteen individual keys 16 for a customer to use when entering his/her PIN and when making transaction selections, each key having either a digit (with one of the numbers from 0 to 9) etched or printed thereon, words such as "Cancel," "Clear", and "Enter," or such like, etched or printed thereon, or left blank. The keypad 14 protrudes from an upper surface 18 of the EPP 10, which also defines a raised keypad perimeter 19. FIG. 1b is a pictorial side view of the EPP 10 in the direction of arrows 1b-1b on FIG. 1a, but with the raised keypad perimeter 19 removed.

FIG. 1c is a schematic diagram of the components within the EPP 10. These components include an encryption unit 20. The encryption unit 20 includes a cryptographic processor 22, volatile memory 24 in the form of random access memory (RAM), and non-volatile memory 26 in the form of FLASH memory. The RAM 24 stores a cryptographic key 28. The FLASH memory 26 stores at least one algorithm 30a (PIN encryption algorithm 30a) for encrypting information entered via keypad 14 using the cryptographic key 28, and one algorithm 30b (key deriving algorithm 30b) for deriving a new cryptographic key.

The encryption unit 20 also includes a secure touch controller 32. The secure touch controller 32 is operable to receive signals from a touch panel (not illustrated in FIGS. 1a to 1c) via a connection strip 34 and to convert those received signals into a touch coordinate for the cryptographic processor 22 to operate on.

The processor 22, the RAM 24, the flash memory 26, and the secure touch controller 32 all communicate via an internal bus 36.

Suitable cryptographic processors 22 include one of the range of secure microcontrollers supplied by Maxim Integrated Products, Inc. of 160 Rio Robles, San Jose, Calif. 95134, U.S.A.

Suitable secure touch controllers 32 include a secure touch sensor supplied by Cirque Corporation, 2463 South 3850 West, Salt Lake City, Utah 84120-2335, U.S.A.

Data from the keypad 14 is transmitted to the cryptographic processor 22. Each key press is transmitted by the secure touch controller 32 to the cryptographic processor 22 as a co-ordinate corresponding to the location of the key 16 that was pressed. The cryptographic processor 22 processes the keypad entries using a keyboard control algorithm (not shown) executing within the cryptographic processor 22.

The cryptographic processor 22 also includes internal RAM (not shown) and internal non-volatile memory (not shown) for use in performing cryptographic functions. The cryptographic processor 22 includes an erase function that operates automatically to delete stored encryption keys within the cryptographic processor 22 (and/or in the RAM 24 and FLASH memory 26) in the event that any sensors in the EPP 10 detect tampering.

In normal operation the EPP 10 outputs encrypted data to an ATM controller module (not shown) via an output port 40 in the form of a USB port.

Figure 2:
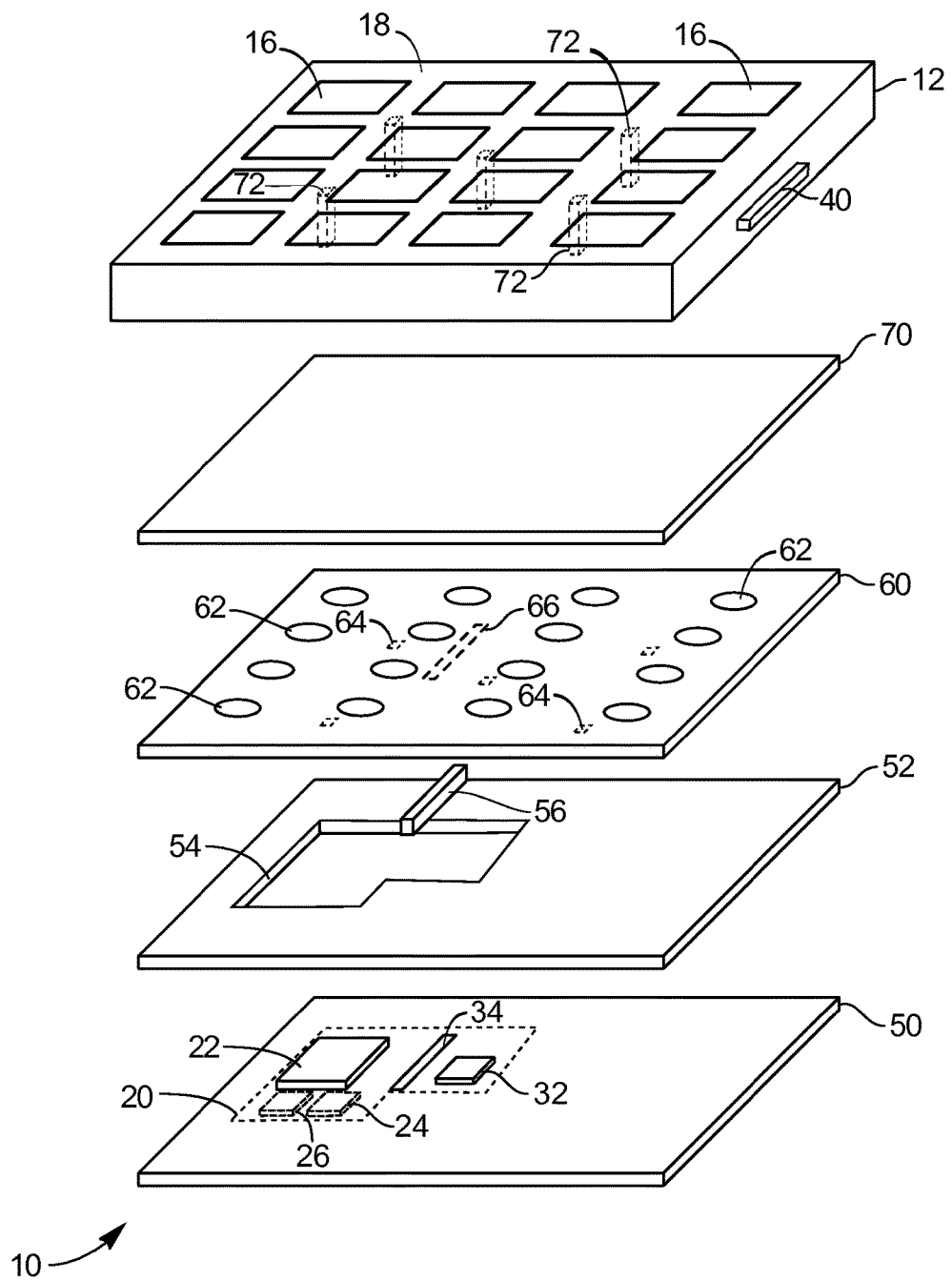
FIG. 2 illustrates an exploded schematic of the EPP of FIGS. 1a to 1c.

Parts of the EPP 10 are shown in more detail in FIG. 2, which is an exploded schematic of the EPP 10. The EPP 10 comprises a plurality of layers mounted within the keyboard body 12.

The lowest layer in the EPP 10 is a base layer 50 comprising a printed circuit board (PCB) on which is mounted the encryption unit 20 including the cryptographic processor 22 for performing encryption functions of the EPP 10 and the secure touch controller 32. This base layer 50 is referred to as the encryption PCB. In this embodiment, the PCBs comprise conventional FR-4 glass reinforced epoxy PCBs.

As shown in FIG. 2, the RAM 24 and the FLASH memory 26 are located on an opposite side of the base layer 50 to the cryptographic processor 22 and the secure touch controller 32. This is possible because the contents of the RAM 24 and FLASH memory 26 are encrypted by the cryptographic processor 22.

The next layer comprises a metal space layer 52 defining an aperture 54 through which an elastomeric connector 56 extends. The elastomeric connector 56 couples to the connection strip 34 on the encryption PCB 50. In this embodiment, the elastomeric connector is a Zebra strip (trade mark).

The layer above the metal spacer layer 52 comprises a keyboard PCB 60. The keyboard PCB 60 is a multi-layer PCB comprising six layers in this embodiment.

The upper layer of the six layers includes 16 dome switches 62 corresponding to, and in registration with, the keys 16, and five separation switches 64. When one of the keys 16 is depressed, the corresponding dome switch 62 flexes.

The second and third layers of the six layers include a touchscreen pattern comprising a layout of copper tracks. This touchscreen pattern is similar to a touchscreen pattern that would be deposited as Indium Tin Oxide on a conventional capacitive touchscreen display panel. The purpose of the touchscreen pattern is to be able to sense which of the keys 16 has been depressed, by sensing the change in capacitance caused by the movement of the corresponding dome switch 62.

Each of the fourth and fifth layers of the keyboard PCB 60 comprises a mesh that is provided to detect any attempt to penetrate the EPP 10, for example, a front drilling attack from the upper surface 18 to try and access the cryptographic processor 22.

The sixth layer of the keyboard PCB 60 is used for routing signals to the elastomeric connector 56 and includes a connector strip 66 to which the keyboard PCB 60 signals are routed. The touchscreen pattern on the second and third layers of the keyboard PCB 60 is coupled to the elastomeric connector 56, which routes a signal from the touchscreen pattern to the secure touch controller 32 via the connection strip 34 on the encryption PCB 50. The secure touch controller 32 ascertains which key 16 this signal corresponds to and conveys this information to the cryptographic processor 22 for processing. The sixth layer of the keyboard PCB 60 also routes signals from the five separation switches 64 to the encryption unit 20.

A sealing layer 70 of elastomeric material (in this embodiment, rubber material) is disposed between the keyboard body 12 and the keyboard PCB 60 to seal the EPP 10, thereby preventing, or at least minimizing, ingress of water and/or dirt. This sealing layer 70 also provides tactile feedback to the keys 16 and helps prevent over-travel of the keys 16 that may otherwise be caused by manufacturing tolerances.

Five posts (in this embodiment, metal posts or pins) 72 are provided between the keyboard body 12 and the keyboard PCB 60. Each of the metal posts 72 abuts a corresponding separation switch 64 and an underside of the upper surface 18.

To assemble the EPP 10, the layers are brought into close contact and maintained in place using screws (not shown). When assembled, each of the metal posts 72 closes the corresponding separation switch 64. The encryption unit 20 monitors the state of the separation switches 64 (that is, whether each switch 64 is open or closed).

If the EPP 10 is disassembled then the metal posts 72 separate from the separation switches 64, causing the separation switches 64 to open circuit. The encryption unit 20 detects this open circuit condition. The encryption unit 20 then responds to this tampering by deleting any critical information (such as stored keys, algorithms, and the like).

It should be appreciated that this embodiment has the advantage that traditional scan lines (as would be used to detect a physical key press on a conventional keyboard) are not required. Instead, a secure touch controller is used to ascertain a location corresponding to a key press. Using a secure touch controller obviates the requirement to protect the 'scan lines' (the pattern delineated on the capacitive sensing layer is not really a scan line) and also ensures that if a fraudulent third party managed to monitor the output of the capacitive sensing layer then no useful information would be obtained because this output needs to be interpreted by the secure touch controller before the touch location can be ascertained. This means that using the secure touch controller is more secure than using scan lines.

Furthermore, the secure touch controller 32 is able to detect any change to the touchscreen pattern on the second and third layers of the keyboard PCB 60. For example, if the EPP 10 is attacked from the front by a third party attempting to attach a wire to the touchscreen pattern to read the signals from the touchscreen pattern, or if conducting ink is injected onto the touchscreen pattern, then the secure touch controller 32 would detect this and inform the cryptographic processor 22. The cryptographic processor 22 would then erase stored encryption keys. Typically, a secure touch controller measures the capacitance (and other electrical parameters) of the touchscreen pattern when the EPP 10 is powered up, and compares these readings with expected readings. Any deviation from expected readings would be communicated to the cryptographic processor 22 as possibly indicative of a tamper event.

This embodiment therefore provides a more secure key scanning method by using technology used in touchscreens (that is, a touch panel and associated sensing technology), but by enclosing this technology within the keyboard body 12 so that a user cannot access the touch panel or sensing technology directly.

Figure 3:
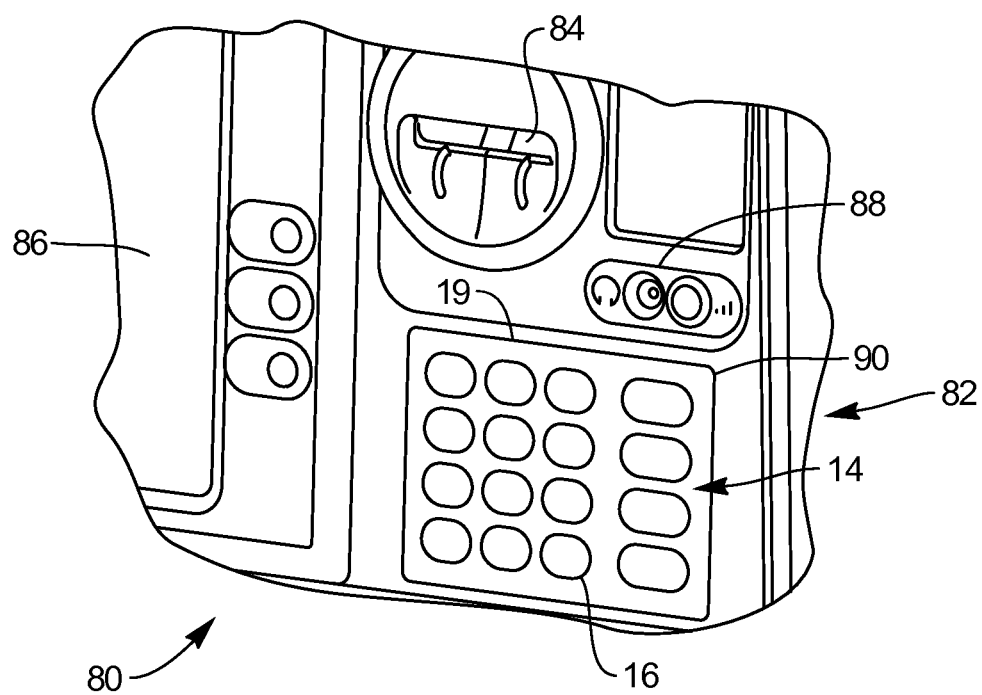
FIG. 3 illustrates part of a user interface of an Automated Teller Machine (ATM) including the EPP of FIGS. 1 and 2.

Reference is now made to FIG. 3, which illustrates part of a user interface 80 of an Automated Teller Machine (ATM) 82 including the EPP 10.

The user interface 80 includes a card reader/writer slot 84, a display 86, and the EPP 10. The user interface 80 can optionally include other access ports/slots, such as a private audio port 88. The keypad 14 of the EPP 10 provides an interface between a customer and the EPP 10. A keypad aperture 90 of the ATM 82 aligns with the keypad perimeter 19 of the EPP 10 so that only the keypad 14 of the EPP 10 is visible to an ATM customer through the keypad aperture 90 of the ATM.

It should be understood however that the EPP 10 may be utilized with other types of SSTs or assisted service terminals, such as automated fuel dispensers, kiosks, self-checkout terminals, check-in terminals, vending machines, or the like.

In other embodiments, different separation switches may be provided (instead of or in addition to the metal posts). In some embodiments, no separation switches may be provided.

In other embodiments, the touchscreen pattern may be located on a single layer of the keyboard PCB 60.

In other embodiments, a different number of layers may be provided than those described above.

In other embodiments, the RAM 24 and FLASH memory 26 may be located on the same side of a PCB as the cryptographic processor 22 and the secure touch controller 32.

Throughout the description and claims of this specification, the words "comprise" and "contain" and variations of them mean "including but not limited to" and they are not intended to (and do not) exclude other features, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:
1. A keypad comprising:
a keypad housing providing individually depressable keys for selection by a user, and five posts between the keypad housing of the keypad and a printed circuit board, each post abuts a corresponding separation switch and an underside of an upper surface of the keypad housing;

a sealing layer of elastomeric material under the keypad housing;

a multi-layer under the sealing layer comprising the printed circuit board with an upper layer of the multi-layer comprising dome switches, second and third layers of the multi-layer comprising a layout of copper tracks for sensing the depressable keys, fourth and fifth layers of the multi-layer comprising mesh for detecting any penetration of multi-layer, and a sixth layer of the multi-layer that routes signals from the depressable keys to an elastomeric connector;

a metal space layer under the multi-layer comprising the elastomeric connector coupled to a connection strip of a sensing layer;

the sensing layer located beneath the metal space layer, the sensing layer including a cryptographic processor, a secure touch controller, non-volatile memory, and volatile memory, wherein the sensing layer configured to ascertain which of the individually depressable keys is depressed using proximity sensing within the keypad housing, and wherein the sensing layer is configured to monitor when any post ceases to depress that post's separation switch to change a monitored state of the keypad and when the change is detected by the sensing layer, the sensing layer is configured to cause removal of cryptographic keys associated with the keypad, and wherein the sensing layer is operable to detect any change to a particular touchscreen pattern generated on printed circuit board by measuring capacitance and electrical parameters against expected readings and the sensing layer is operable to communicate any deviation in the touchscreen pattern to the touch controller as being indicative of a potential tamper event for the keypad, and wherein the sensing layer is configured to detect a wire connected to a touchscreen that is attempting to read the touchscreen pattern and detect a presence of conductive ink injected onto the touchscreen and the sensing layer is configured to notify the touch controller as other potential tamper events for the keypad, and the volatile memory for storing a particular one of the cryptographic keys during operation of the keypad and the non-volatile memory for storing an encryption algorithm and a cryptographic key deriving algorithm, wherein the sealing layer provides tactile feedback to the depressable keys, seals the keypad from ingress of water and dirt into internal components of the keypad, and prevents over-travel of the depressable keys that may otherwise be caused by manufacturing tolerances, and wherein the elastomeric material is rubber.

2. The keypad of claim 1, wherein the proximity sensing is implemented using capacitive technology.

3. The keypad of claim 1, wherein the proximity sensing is implemented using resistive technology.

4. The keypad of claim 1, wherein the proximity sensing is implemented using inductive technology.

* * * * *